United States Patent
Nemoy et al.

(10) Patent No.: US 8,413,261 B2
(45) Date of Patent: Apr. 2, 2013

(54) SHARING PRIVATE DATA PUBLICLY AND ANONYMOUSLY

(75) Inventors: Yaakov M. Nemoy, Pittsburgh, PA (US); Michael McGrath, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1025 days.

(21) Appl. No.: 12/130,867

(22) Filed: May 30, 2008

(65) Prior Publication Data

US 2009/0300723 A1    Dec. 3, 2009

(51) Int. Cl.
    *H04L 29/06*   (2006.01)
(52) U.S. Cl. .................................. 726/33; 726/4; 726/7
(58) Field of Classification Search ................ 726/4, 33, 726/7
    See application file for complete search history.

(56) References Cited

U.S. PATENT DOCUMENTS

| 7,426,750 | B2  |   | 9/2008  | Cooper et al. |
| 2004/0006688 | A1 | * | 1/2004 | Pike et al. ......................... 713/1 |
| 2005/0138004 | A1 | * | 6/2005 | Teplitsky et al. ................. 707/3 |
| 2007/0002840 | A1 | * | 1/2007 | Song et al. ..................... 370/352 |
| 2007/0061889 | A1 |   | 3/2007 | Sainaney |
| 2007/0106775 | A1 | * | 5/2007 | Wong ............................. 709/223 |
| 2008/0109657 | A1 | * | 5/2008 | Bajaj et al. ..................... 713/168 |
| 2008/0249938 | A1 | * | 10/2008 | Drake-Stoker .................. 705/44 |
| 2008/0275829 | A1 |   | 11/2008 | Stull et al. |
| 2009/0249222 | A1 | * | 10/2009 | Schmidt et al. ............... 715/751 |
| 2011/0066607 | A1 | * | 3/2011 | Wong ............................. 707/706 |

OTHER PUBLICATIONS

Tootoonchian et al. "Lockr: Social Access Control for Web 2.0" Aug. 18, 2008, Workshop on Social Networks (WOSN' 08) pp. 43-48.*

* cited by examiner

*Primary Examiner* — Kambiz Zand
*Assistant Examiner* — Michael Guirguis
(74) *Attorney, Agent, or Firm* — Lowenstein Sandler LLP

(57) ABSTRACT

Sharing a secret that can later be revoked. A client sends data to a server that makes the data available to other clients. The data is shared generically without specifically identifying the client. The data can be considered quasi-secret data or data that is secret except for the anonymous sharing of the data. The client can later make the shared data private again by changing or deleting the sharing of the data.

21 Claims, 9 Drawing Sheets

| ACCESS ENGINE 700 | | |
|---|---|---|
| FUNCTION 710 | ACTION 720 | OPERATION 730 |
| SEND | SUBMIT DATA | pub_ID |
| UPDATE | CHANGE SUBMITTED DATA | pub_ID |
| SHOW | MAKE DATA AVAILABLE | pub_ID |
| HIDE | MAKE DATA PRIVATE | pub_ID |
| RATE | COMMENT ON VIEWED DATA | pub_ID, (prv_ID) TOKEN |

FIG. 7

SHARING PRIVATE DATA PUBLICLY AND ANONYMOUSLY

FIELD

The invention is generally related to computer networks, and more particularly to a client sharing data anonymously on a network and being able to share a secret and then revoke the secret.

COPYRIGHT NOTICE/PERMISSION

A portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright ©2008, Red Hat, Inc., All Rights Reserved.

BACKGROUND

It is said that once a secret is shared, it is no longer a secret. There may be many scenarios where a user or a participant in a network may wish to share data, but is reluctant to do so knowing that the data will no longer be secret. For example, participants in social and/or research networks may attempt to resolve whether to share data to promote the progress of the network, or retain data out of a concern with the security of making the data public. As used herein, social or research networks refer to networks or groups of collaborating users. The users represent individuals or entities that participate in the groups, and are associated with a client device. Reference herein to client may refer to the user and/or to the client device. Such networks are typically managed by a central server, but management could be distributed among various clients and/or servers, as is understood in the art.

Sharing the data is commonly performed in one of two ways. The data can be shared publicly, and identifies the user or client associated with the data. Such a method provides the least security for the client's data. The data could alternatively be shared anonymously, with the caveat that if the identity of the client associated with the data is discovered, either through the client identifying the client's own identity, or through someone else discovering that identity, the anonymity is lost. Thus, current systems rely on clients wanting share data openly, or sharing with the trust/hope that they will remain anonymous.

In the eyes of some potential users, such sharing mechanisms do not provide adequate assurance of privacy. The lack of control over the shared data may prevent potential users from participation. Thus, the networks may not be able to benefit from the participation of such potential users.

BRIEF DESCRIPTION OF THE DRAWINGS

The following description includes discussion of figures having illustrations given by way of example of implementations of embodiments of the invention. The drawings should be understood by way of example, and not by way of limitation.

FIG. 7 is a block diagram representing an embodiment of functional operations of an engine to enable a client to manage shared data.

DETAILED DESCRIPTION

Figure 1:
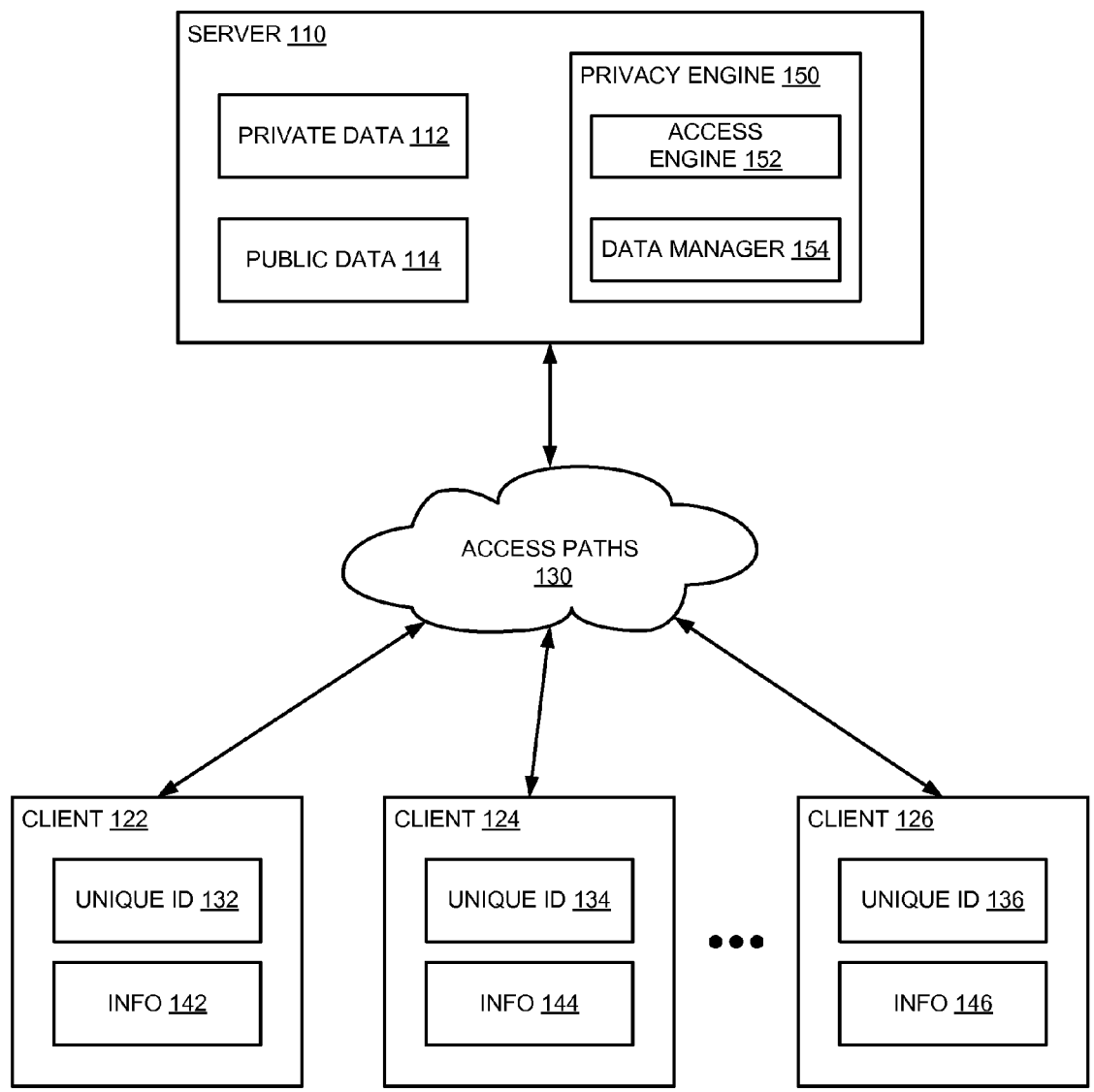
FIG. 1 is a block diagram of an embodiment of a network system in which a client publicly and anonymously shares private data.

Mechanisms allow for the sharing of data to make the data publicly available, and revoking the sharing of the data to cease making the data publicly available. A client sends data to a server that makes the data available to other clients. For example, in one embodiment, the data is a computer platform profile information that is shared on a social network hosted by the server. The server associates the data with a public identifier that does not identify the client that owns the data. The data is shared generically with reference to the identifier and not reference to the client. The data can be considered quasi-secret data or data that is secret except for the anonymous sharing of the data. The client can later request the server to stop making the data available. The server dissociates the public identifier from the data, which invalidates the public identifier. In one embodiment, the data is made available to clients of the server by the server providing a link to the data associated with a particular client. If the particular client's public-facing identifier is dissociated from the data, the link to the data may be made unavailable, and selecting the link would provide an error message rather than navigating to the data.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required operations of the method. Structure for a variety of these systems will appear as set forth in the description below. In addition, the present invention is not described with reference to any particular programming language. It will be appreciated that a variety of programming languages may be used to implement the teachings of the invention as described herein.

FIG. 1 is a block diagram of an embodiment of a network system in which a client publicly and anonymously shares private data. System 100 represents a social network in which clients 122, 124, and 126 participate. An example of a social network may be smolt.org, in which users post information about hardware and software configuration settings of their computing devices, which information may then be selectively available for viewing and rating, and for compiling for statistical purposes.

Server 110 is a server of the system 100, which may be one of many servers that host the network. The network may be hosted in a centralized or distributed fashion, as is understood by those skilled in the art. Server 110 includes private data 112 and public data 114. Private data 112 and public data 114 represent information stored on server 110 in one or more database storage devices. Generally, for every type of computing device, there are any of a number of copies of that device. Clients 122-126 represent the computing devices of users of the network of system 100. The private aspect for the clients is that a user owns one of the computing devices, and may have it configured a particular way. Even though the configuration may be identical to that of another user, the particular configuration is private to the user. The client computing device (also referred to herein as a client device) and the operating system executed on the client device make a unique key of information. More particularly, the configuration settings of the hardware and software environments of the client device make the key of information. Server 110 issues a unique identifier to each client 122-126, shown as unique IDs 132-136, respectively. Info 142-146 on each client 122-126, respectively, represents profile information or configuration information that may be shared on the network of system 100.

Each client sends its information to server 110, which stores the data for use in the network. Private data 112 represents information that is private and should only be accessible to the client that posted the data. While the definition of private and public data may change from implementation to implementation, in general, private data is data that is considered or agreed between the server and client (either collectively with all clients, or potentially individually) to be information that could expose the identity of the client. The client's private identifier would be one example. A complete configuration profile may be another example. One element of a configuration profile (e.g., a particular setting) would generally be public data rather than private data. The profile information combined and presented as statistics or lists may be public data or private data, depending on how it is presented, but may likely be public data. Private data 112 thus includes keys (e.g., public and private identifiers) and profiles. Public data 114 includes compilations and subsets of data that is likely to maintain the anonymity of the information owner.

Clients 122-126 and server 110 communicate over a "network" in the sense of access paths 130 over a public network (e.g., the Internet) and/or private network (e.g., a home network, an office network). Access paths 130 represent the communication paths including interface and routing equipment that enables a client to access server 110. Access paths 130 may include wireless or wired paths.

Server 110 includes privacy engine 150, which is an abstraction to represent components that enable server 110 or some other computing system (see an example in FIG. 8) to perform operations related to a client anonymously sharing data, whether from the client-side or from the server-side. Privacy engine 150 thus may represent one or more components executed on a processor of server 110. Privacy engine 150 may include access engine 152 to establish and/or use UUIDs for a client platform. Privacy engine 150 also includes data manager 154, which manages access and use of public and/or private data (112, 114) stored on server 110. Thus, data manager 154 can manage UUID associations and associations between data and UUIDs.

System 100 provides an example system in which embodiments of the invention may be implemented. In general, whether implemented in system 100 or some other system, mechanisms are provided to enable revoking a secret. Thus, if a client shares information anonymously, and the anonymity is compromised, the information can be shared in a different way to take back the "secret" that the information is related to the particular client. By the client changing its public-facing identity associated with posted data, the "secret" of the information being associated with the client is revoked from public access.

The client can post data publicly while retaining control over the privacy of the posted data, rather than releasing control over its privacy when publicly shared, as results from previous systems. In general, a particular secret can be shared and revoked by association of the secret with a master secret. Thus, a primary or master secret (e.g., a private client identifier) can be held secret by a client, and data shared by a secondary secret (e.g., data associated with a public identifier that anonymously associated with the client through the master secret). In one embodiment, the secrets are UUIDs (universally unique identifiers), which may also be referred to as GUIDs (globally unique identifiers), which are identifiers that are associated with a single entity. For purposes of simplicity in description, and not by way of limitation, the descriptions below will generally be limited to the example of a UUID. While UUIDs can be implemented in a number of ways, one implementation involves a 36 byte value (which yields almost $5 \times 10^{86}$ unique combinations), which results in a statistical impossibility of overlap of UUIDs. The UUIDs can be generated, for example, by a standard interface in a Linux kernel executed on the server.

One UUID is a master secret that is stored on each client, and uniquely identifies the particular hardware and operating system configuration, collectively referred to herein as the "platform." Observe that dual-boot machines would have two UUIDs, and virtual machines operating on shared hardware resources would each have separate UUIDs. The master secret is referred to herein as a private identifier or private UUID. The private UUID is considered an absolute secret, and should be protected from being released in the public. While the specifics of how the private UUID are kept secret is outside the scope of the discussion herein, in general, the client is expected to implement measures to protect its secrecy. Any technology local to the client device may be used to protect the private UUID, including, but not limited to ACLs (access control lists) or other mechanisms that limit what application or functions have access to the data, SELinux (Security Enhanced Linux, which uses Linux security modules (LSMs) in the kernel to provide security), AppArmor (a Linux application allowing an administrator to associate a security profile with each application, and allows assign access restrictions based on security profile), libraries that hold information in an encrypted state in memory and scrub the memory once the data is "checked out" or accessed from the library, etc.

In one embodiment, the server hosts a social network, and the data shared with the server relates to computing technology profiles associated with each participant of the network. The data shared may include hardware specification and software settings, and my be information such as build information, data about the computer system, platform, how many computers the client owner has, operating system (OS) data, language, memory and swap information, CPU (central processing unit) information, machine brand, kernel, security capabilities, etc. The data can be shared for purposes of diagnostics and statistics.

A general implementation may include the client submitting data to be posted and shared to the network. When submitting data, the client side program uses the private UUID to the client to the server. The user (human actor) behind the client device does not need to actually see the UUID, and in one embodiment the UUID is restricted to the internals of the program. The posted data is stored on a collection server of the network, and linked solely to the private UUID. In one embodiment, no IP address information nor other data identifying client is saved, and an actual data record stored in the network includes only the private UUID and associated data. With only the private UUID, no connection can be made back to the client sender. Only when the client connects to the server, supplying a private UUID can the server identify a specific user.

When a server receives a record incorporating a private UUID, the server also creates a public UUID. The public UUID is unique to the client machine and the OS. In one embodiment, the public UUID is also unique to the particular server. Thus, when two servers share data, each server stores a separate public UUID for each private UUID.

For a client to view or share data on the server, the client requests the public UUID from the server. The client program could wrap such a function call to display a valid URI (uniform resource identifier). The client has responsibility over the use of the public UUID. The most private course of action is to never share the public UUID. However, the client is free to distribute the pubic UUID. Any entity with a valid public UUID to a server and information about the client associated with the public UUID, knows the identity of the data stored on that server. If any entity other than the client associated with the public UUID has access to the UUID, the identity may be compromised. If a user feels the user's identity has been compromised, the user may request the server for a new public UUID. Requesting a new public UUID invalidates original UUID, and prevents the use of the original UUID to access private data on the server.

The changing or deleting of UUIDs does not prevent the server from distributing public data from the network—the server may continue to distribute public data to anyone, which is the premise of the server's operation. As used herein, public data refers to data that is generic and cannot be specifically associated with any given client. For example, compilations of statistics (e.g., how many or what percentage client machines execute a particular kernel or have a particular hardware configuration), or single items of data (e.g., a list of what operating systems are used) may be considered public data, where a complete configuration, or a combination of certain core data items such as brand, OS data, and CPU data may be private data because the combination of items limits the possible information owners to a small group. The distinction between private data and public data hinges on how likely it would be to identify a client from the data, and can be established by agreement between the client and the server. Thus, UUIDs are principally used to access private data, and elements of the data may be publicly shared anonymously.

In one embodiment, the server and service provider may also provide additional functions on the server, such as linking recorded information with other information, such as a user account on a third service. One specific example is in reference to smolt.org, where the Smolt service may link data to Fas (Fedora Account) accounts to enable Bodhi and Koji build services to obtain information about the hardware used to build a package. Another example of linking recorded information is rating the functionality of devices, which is discussed in more detail below. In general, rating functionality involves the server including not only data the client program has provided to the server, but also information entered manually by a user of the client device.

In one embodiment, the data is available via a link to the data presented on or after the presentation of the public UUID, and the link can be revocable. With a revocable link, the client shares data and obtains services on the network, and the client can also "unshare" the shared data and make data "disappear." It will be understood that the data may still be present on the network, but access to the data via the public UUID is lost when the link is revoked. Access to the data could then be restricted by a different revocable link accessible via a new UUID.

In one embodiment, the server searches for a public ID when it receives profile information from a client. If the public ID exists, the server can associate the new profile information with the existing public ID. If a public ID does not exist, the server can then generate one and associate it with the profile information. The server runs the profile or updates to the profile information, and sends back the public ID to the client. The client can be assigned a new public ID by presenting the private ID. The server stores a link between the public ID and the private ID for the client. In one embodiment, the two IDs are stored together in a database on the server.

When editing information a client has posted to the server, the user at the client machine, or an administrator of the system, depending on level of access required, may request an 'admin' token from the server. In one embodiment, such an exchange occurs with the server requesting the private UUID, and then sending back two tokens upon authentication of the private UUID. The first token is the public UUID. In one embodiment, the second token is a numerical hash generated from the public UUID and the private UUID. In one embodiment, the token can be a temporary cookie in a browser on the client. Other identifying features could be added to the hash to provide greater security to the admin token, such as the IP (Internet Protocol) address the request was made from, or the time of the request. The IP address can restrict the use of the token from a particular machine, and prevent passing, sharing, or stealing the token. The time of the request or other timestamp can provide an expiration or TTL (time to live) to the token. For example, an admin token may be valid for 20 minutes after generation. The admin token may be referred to as a third level token, where the private UUID and the public UUID are the first and second levels, respectively. The admin token can provide the ability for a client to access different services or additional information on the server.

In one embodiment, the token is simply a string, and so it can include any data type. The token can be formatted, for example, by having the first x characters represent one field of data to represent something, the next y characters represent another field of data to indicate something else, etc.

In one embodiment, there are particular enumerated functions that are supported on a network that shares data in a revocable was, as described herein. The functions may include send, update (or delete), show, hide, and rate. It will be understood that the naming convention of these functions is implementation specific, and other naming conventions could be used. Different functions may require different levels of access tokens, and may be implementation specific. Certain functions and services may be allowed to a client with a simple presentation of a public ID. Other functions may require the private ID and/or an administrative token. An example implementation is provided below, and should be understood as illustrative rather than restrictive.

In one embodiment, send and update or delete refer to operations by a client on data. The information owner, or user operating the client device, can submit or send data to a single server. The server enables the exchange with the client device based on the public ID of the client. Updating information occurs the same way. The client presents the public ID to the server, which then allows the client to send data. Sending data can be accomplished with an application executing on the client, and/or by manual user input. Thus, an application on the client may gather information to send to the server, and the user can input data directly. Updating may involve the client accessing the data stored on the server, and making changes to it. An alternative may involve having standard submission protocols that identify information types that are being submitted, and the server overwrites stored data with new data of the same type. A submission of data could also indicate whether the data is additional data to store and make available, or whether the data is intended to replace stored data.

In one embodiment, the show function allows the server to show the user's profile to the user anonymously. The client presents the public ID to the server, which then provides access to the data. In one embodiment, public IDs are prefixed with 'pub_', and are only stored on the server. In another embodiment, public IDs can also be stored on the client, for example, as a way of being cached. Note that a public ID stored at a client may not be authoritative, and it may be that only when a public ID is stored at the server does it provide the ability to access certain functions with respect to data. Public IDs can be unique to each server, even within the same network. Any valid client that presents the public ID can access the private data associated with the public ID.

In one embodiment, the hide function allows a client to invalidate a particular public ID and obtain a new public ID. Alternatively, a user may stop participating in the network, in which case the public ID may be invalidated, and the data associated with the user be removed. When hide is executed, the old public ID becomes invalid for accessing data, and the data ceases to be associated with the public ID. Thus, the client can become anonymous, even if the identity of the client has been compromised. In one embodiment, a client can request and obtain a new public ID without restriction in frequency or number.

In one embodiment, the four functions described above: send, update, show, and hide, do not require the client to authenticate with the server with the private ID. The server can simply allow any client with a valid public ID to execute the functions. In certain implementations, the server can be configured to require the client to use the private ID to access one or more of the functions. The operations of these functions are performed on data that exists on both the server and the client or data owner. Thus, when a code path on a client has access to a public ID, it has access to perform operations on data; otherwise, the client may be limited to viewing public data.

In one embodiment, a rate function is also supported. The rate function operates on data that is stored only on the server, from the perspective of the client executing the rate function. The rate function is a function performed by a client on data of another client of the server. Other data can also be stored on the server, such as a link to a FAS or Launchpad account, or some other administrative token. In general, a rating refers to commenting on a profile or a configuration set forth in a profile. Some clients may have permission to alter the ratings by making comments or providing a rating, and other users might only have permission to view the ratings. Some information should be hidden completely. To resolve the permissions, the network can use secondary tokens. In one embodiment, a public ID can be thought of as base level access, while a public ID and a token can be thought of as an additional level of access. In one embodiment, viewing ratings and making ratings are the only two levels of access permitted. Other levels could be added, depending on the network implementation. For example, profiles or data may be tiered, and access levels can be matched to particular tiers. Or certain ratings may be given more weight than others (e.g., "super-users").

As stated above, the rate function is a function performed by a client on data of another client of the server. Note that the core data of the data content owner is not changed. Thus, certain data, for example the hardware profile of a user, is core data that is inherent to a client device and cannot be changed without modification to the hardware and/or software configuration of the client device. The rate function as enabled by an administrative token may be used to generate a comment or an opinion that can be stored at the server. Thus, the rate function allows editing information that is particular to a server, meaning the rating or opinion, where the server is the only source of such information. In one embodiment, the first level of access can be thought of as enabling access to core data that is owned (presumably) by the entity that holds the primary key (the public/private ID). The second level of access can be thought of as enabling access to secondary data that is generated by anyone authorized by a token to generate data about the core data, which secondary data only exists at the server.

Figure 2:
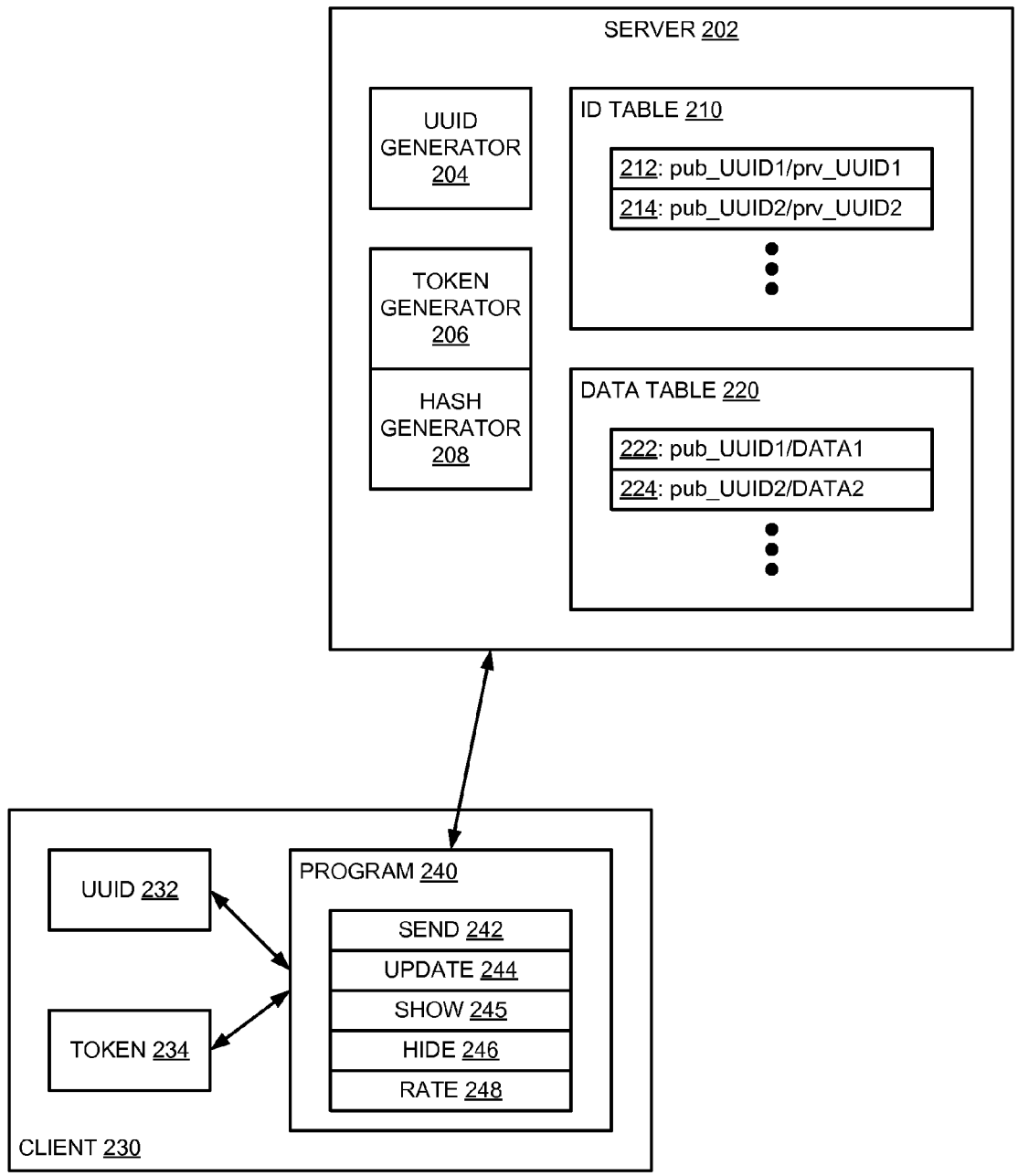
FIG. 2 is a block diagram of an embodiment of a client that provides private data to a server for publicly sharing.

FIG. 2 is a block diagram of an embodiment of a client that provides private data to a server for publicly sharing. System 200 represents an example of components of a social network as described herein. The specific components of the system shown include server 202 and client 230, where server 202 is the hardware and software that hosts certain data and interfaces client 230 with the social network. Client 230 represents an end-user device platform. There may be multiple platforms that exist on a single piece or set of hardware components.

When client 230 access sever 202 to participate in system 200, server 202 generates a unique identifier for the client. Specifically depicted in system 200 is a UUID, as generated by UUID generator 204. UUID 232 represents either the private UUID that would be associated with client 230, or a public UUID that client 230 would use to interact with server 202.

Server 202 may store information in different ways. For example, server 202 may include ID table 210, which indicates a link between public UUIDs and private UUIDs. Thus, ID table 210 may include entry 212 indicating that pub_UUID1 is associated with prv_UUID1, and entry 214 indicating that pub_UUID2 is associated with prv_UUID2. Consider that UUID 232 represents the private UUID of client 230. UUID 232 will be included somewhere in ID table 210 and associated with the public UUID associated with its private UUID. If the public UUID assigned to client 230 were to be changed (e.g., the client requests to "hide"), server 202 will update ID table 210 to associate private UUID 232 with a different public UUID. Server 202 also includes data table 220, which is depicted as including entries 22 and 224 to shown an association between private data and public UUIDs.

Client 230 includes program 240, which represents a program executing on the client device. In one embodiment, client 230 has access to various functions via program 240. The specific functions shown are send 242, update 244, show 245, hide 246, and rate 248. These functions are described in more detail below with respect to FIG. 7. Program 240 could be, for example, a web browser that access particular services to cause the functions to execute. Note that although depicted as functions accessible on client 230, the execution of the functions could occur in part or in whole on server 202. Send 242 and update 245 are functions that involve program 240 sending information to server 202, and server 202 receiving and storing the data. Show 245 causes server 202 to perform an operation, which enables client 230 to view data. Hide 246 simply involves a request on client 230, and the operation of eliminating one public UUID and replacing it with another are performed on server 202. In one embodiment, rate 248 is performed entirely at server 202 by a user through access to the server via a web browser or other remote connection client. In one embodiment, rate 248 is an operation performed through client 230 by a user (for example, via a client program executing at client 230), and client 230 sends rating information to server 202, which can then store the information and may process the ratings information.

In one embodiment, at least one of the functions of program 240 involve the use of token 234, which provides access to data not accessible with only the public UUID. For example, the rate function may require the use of a token. In addition to UUID generator 204, server 202 includes token generator 206, which may optionally include hash generator 208, or work in conjunction with hash generator 208. Token generator 206 and hash generator 208 represent one or more components that respectively provide functionality to generate an administrative token, and to perform an algorithmic function on certain values to create an administrative token. In one embodiment, token generator 206 generates a token from a combination of a public and a private UUID of the requesting client. A similar token generator and/or hash generator may exist on the requesting client as well. Thus, the client and the server may perform the token generation algorithm on the public and private UUIDs and compare the results. Those skilled in the art will understand that a hash is one possible function that could be performed to generate a token, but some form of checksum, encryption, or other form of mathematical manipulation of a public and/or private UUID could be used. Note that multiple forms of hash algorithms could be employed to generate the hash. In one embodiment, hash generator 208 and token generator 206 are the same component. In another embodiment, hash generator 208 is part of token generator 206.

As described above, a token may be generated from a public and/or private key. A token may also include the combination of the key(s) with another element. That other element could be, for example, a timestamp. The timestamp may indicate a time of generation of the token. The system can be configured to block access from any token that is older than a given amount of time (e.g., 30 minutes). The other element could be, for example, an IP address of the requesting client. Combining the IP address in the token can prevent the sharing of the token to devices having different IP addresses. Both additional elements could be used.

Figure 3:
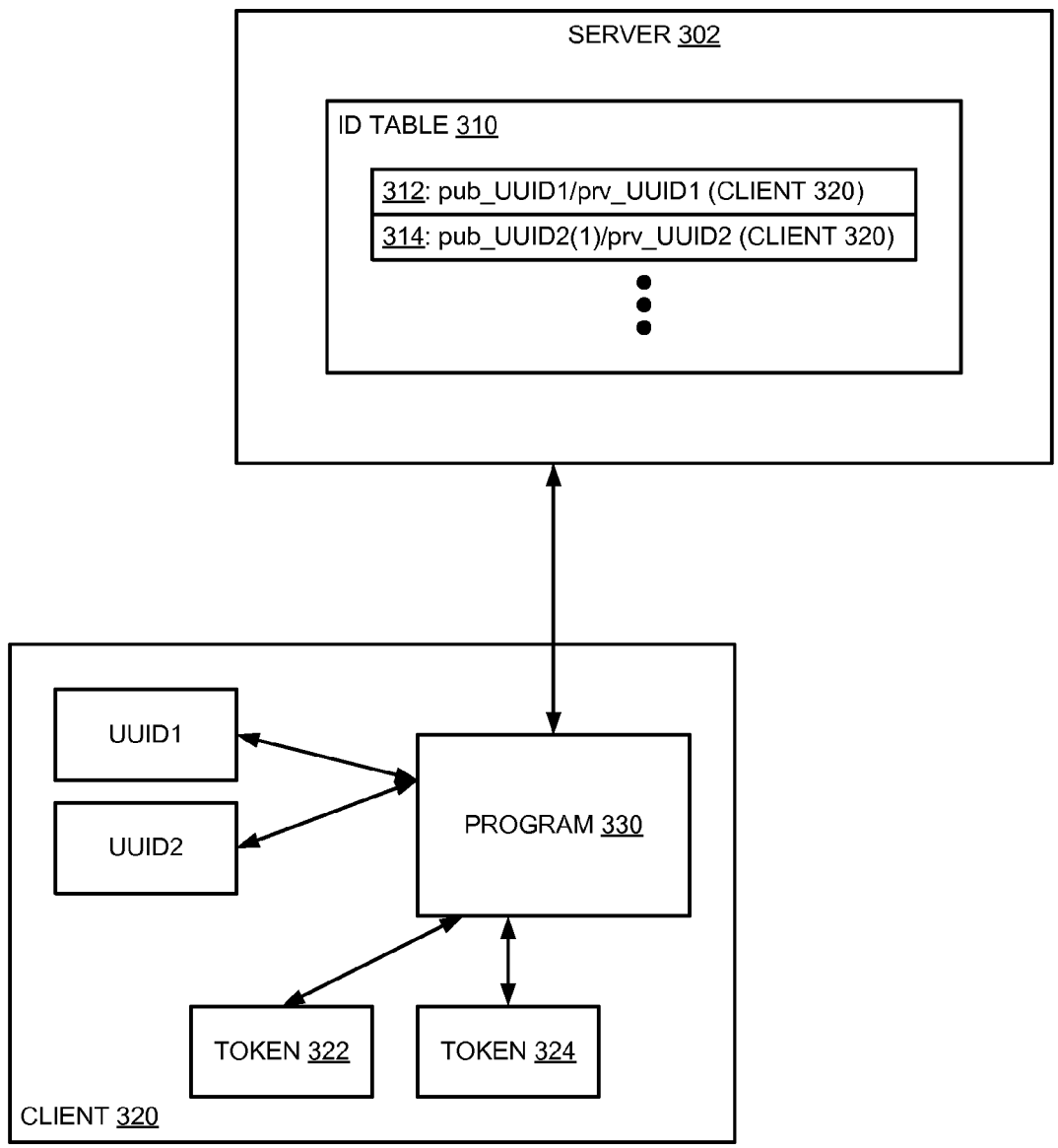
FIG. 3 is a block diagram of an embodiment of a client having multiple private identifiers that a server associates with private data for sharing.

FIG. 3 is a block diagram of an embodiment of a client having multiple private identifiers that a server associates with private data for sharing. System 300 is an example of a system such as systems 100 and 200 described previously, with examples of similar components. Specifically depicted is client 320 having multiple private UUIDs, UUID1 and UUID2. Server 302 includes ID table 310, which has entries 312 and 314 indicating relationships between public and private UUIDs.

In one embodiment, the computing system represented by client 320 includes multiple different computing platforms. Thus, different configurations of hardware and software are capable. One simple example is when client 320 is a dual-boot machine, and the different configurations refer to the same hardware with the different OSes that can be executed on client 320. Each OS configuration represents a distinct entity to server 302, which generates different UUIDs (i.e., UUID1 and UUID2) for the different configurations of the client. UUID1 can be understood to be a first private UUID assigned to client 320, and UUID2 is a second private UUID assigned to client 320. Each UUID is accessible to client program 330, which provides access to server 302 from client 320 for a user. Client program 330 accesses the UUIDs (and tokens, discussed below) and interacts with server 302.

Server 302, in turn, assigns a public UUID (pub_UUID1) to data associated with client 320. The data may be a profile indicating all configurations of client 320. In one embodiment, each private UUID is assigned a separate public UUID; however, there may be a single public UUID associated with the data associated with client 320 rather than with each private UUID. As illustrated, ID table 310 links public and private identifiers, pub_UUID1 is associated with UUID 1 and either pub_UUID2 or pub_UUID1 (as illustrated by the parenthetical '1') is associated with UUID2. Note that when a single client device has multiple configurations, the data stored on the server may be limited to the particular configuration, which would suggest the use of different public identifiers for each private identifier. If a server is configured to store all data associated with a client device (meaning all different configurations) together, it may make sense to configure the server to associate a single public identifier with the data, which could then be linked to all private identifiers associated with the client device.

In addition to have UUIDs assigned to client 320, the client may also have multiple tokens 322 and 324 assigned to it. In one embodiment, the tokens exist for different purposes, such as in an implementation where different functions supported by server 302 are enabled by different tokens. Alternatively, tokens 322 and 324 may not exist concurrently, but be different tokens to perform the same operations at different times. Alternatively, the different tokens could be linked to IP address, and client 320 may have different IP addresses associated with it (e.g., a wireless link and a wired link).

Figure 4:
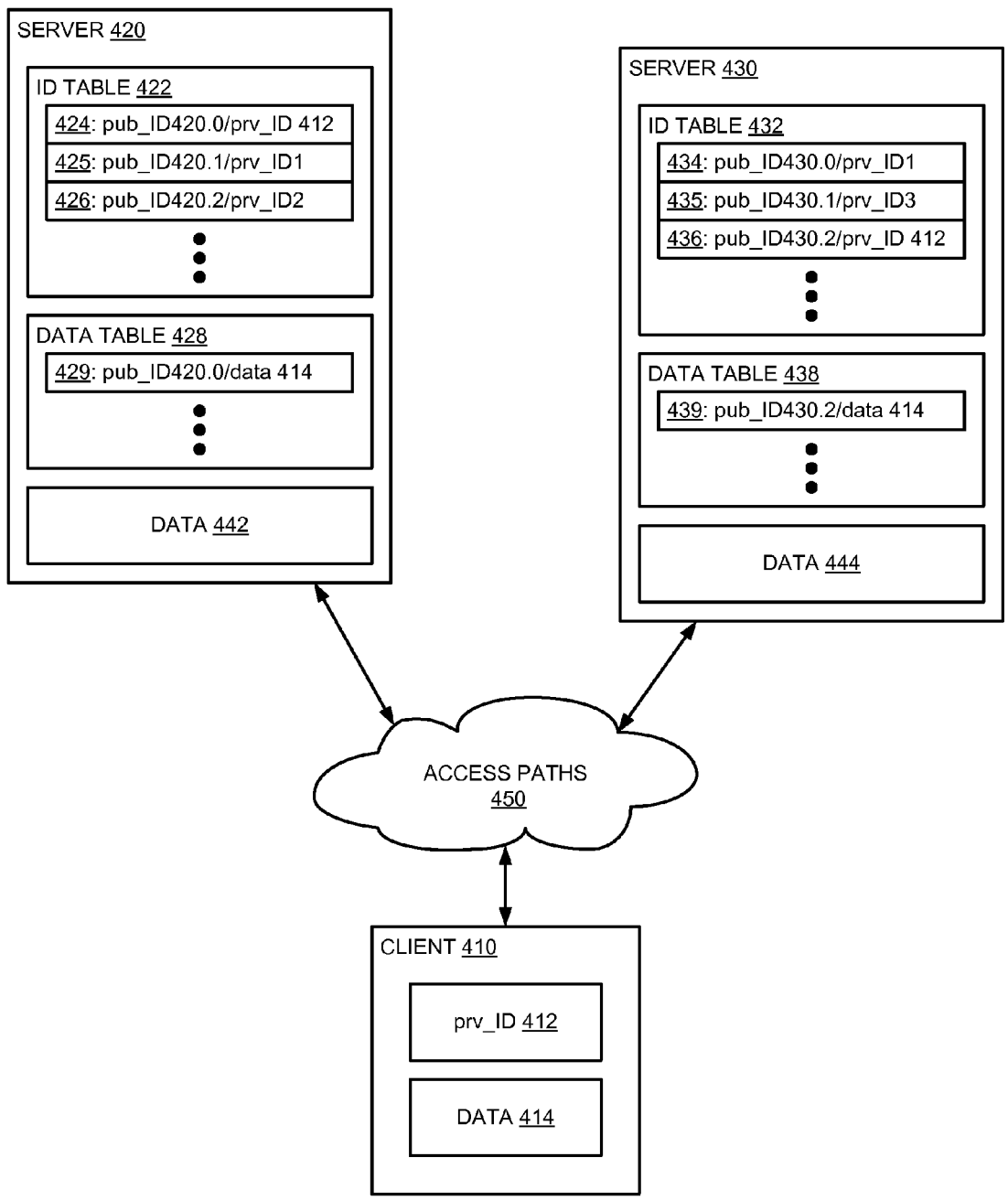
FIG. 4 is a block diagram of an embodiment of a system where multiple servers share private data associated with a client.

FIG. 4 is a block diagram of an embodiment of a system where multiple servers share private data associated with a client. System 400 is an example of a system having servers and clients according to any described herein. Specifically illustrated is client 410, which participates in a social network by sharing private data that may be anonymously presented to other clients of the network. System 400 is illustrated with two servers, 420 and 430, which host data and participate in the social network. Client 410 accesses one or both of server 420 and 430 through access paths 450. Note that access paths 450 could commonly be referred to as a "network" in that one or more network connections provide the access paths for client 410. The access paths could also commonly be referred to as "network paths". However, for simplicity in description to avoid confusion over the "social network" in which client 410 participates, the network and networks paths connecting client 410 to the servers are referred to as "access paths," and system 400 represents elements of the social network.

Client 410 includes private identifier (prv_ID) 412, which is a private identifier as described above. Client 410 also include data 414, which indicates configuration settings associated with the hardware and software platforms (collectively the computing platform) of client 410. Data 414 is posted to one or more of servers 420 and 430. Client 410 generally has a main access server, say server 420, with which the client connects and posts data to the network. In one embodiment, servers within the network share records or posted data. Sharing data between servers can provide better statistical analysis or more accurate or informative information to users of the network.

Thus, in one embodiment, server 420 includes data 442, which includes data 414 posted by client 410. Some or all of data 414 may be shared with server 430, and be included within data 444 stored on server 430. Mechanisms for sharing data between servers are known by those skilled in the art, and will not be discussed in detail here.

As mentioned above, in one embodiment, public identifiers are specific to a server that issues the public identifier. Public identifiers are associated with data stored on the server. Thus, servers 420 and 430 will generate public identifiers to associate with data 414 of client 410. The public identifiers generated by the different servers will also be different. Each server will separately associate the public identifier with the data.

Server 420 includes ID table 422 with entry 424 that associates private ID 412 of client 410 with public identifier pub_ID420.0 generated by server 420. Entries 425 and 426 indicate public identifiers generated for other private identifiers of different clients (not shown). Similarly, server 430 includes ID table 432 with entry 436 indicating public identifier pub_ID430.2 associated with prv_ID 412. Other entries indicate public identifiers for other clients (not shown), which may have partial, complete, or no overlap with clients for which server 420 has public identifiers. In one embodiment, a client's identifier is meaningless to a server until the client sends a message to the server. Once a message is sent, the client is recognized by the server, and the identifier has meaning within the server. Server 420 includes data table 428 with entry 429 to indicate pub_ID420.0 is associated with data 414. Similarly, server 430 includes data table 438 with entry 439 to indicate pub_ID430.2 is associated with data 414.

Figure 5A:
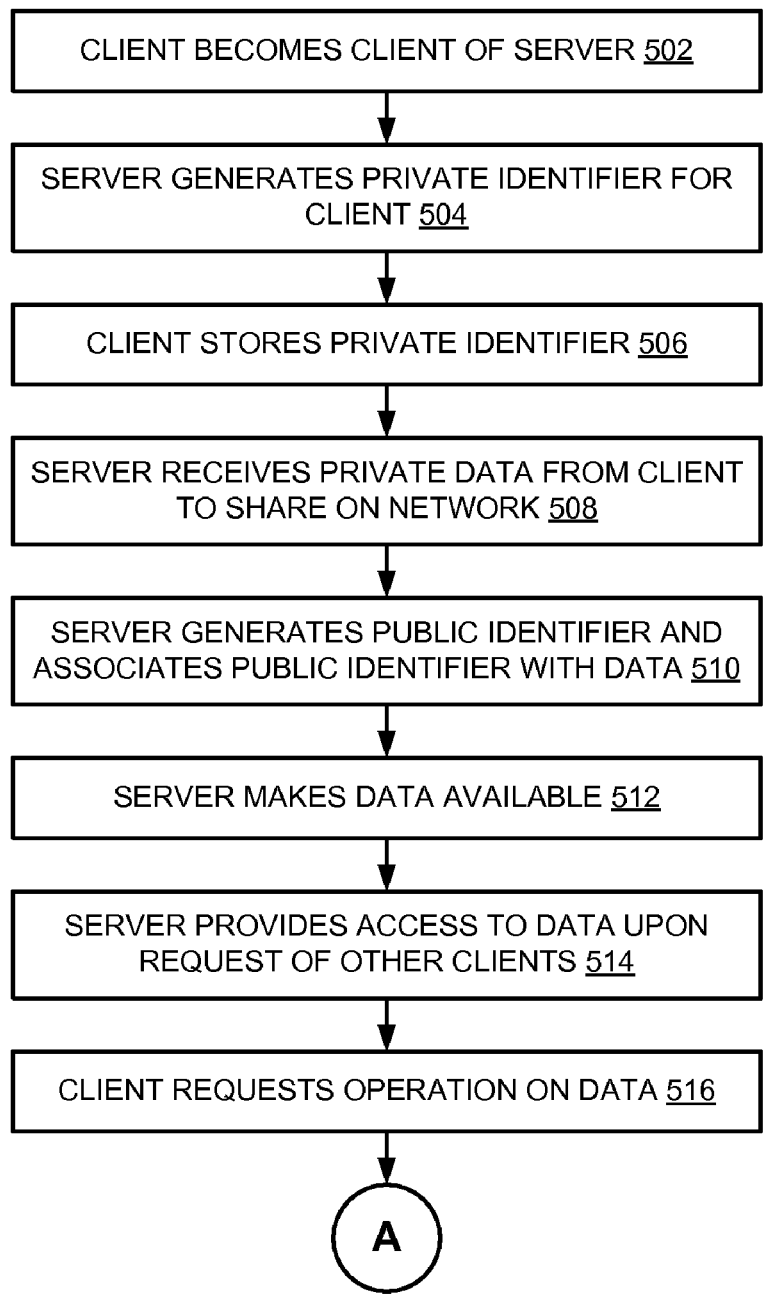
FIGS. 5A-5B represent a flow diagram of an embodiment of a process for a client sharing private data and being able to manage the private data.
Figure 5B:
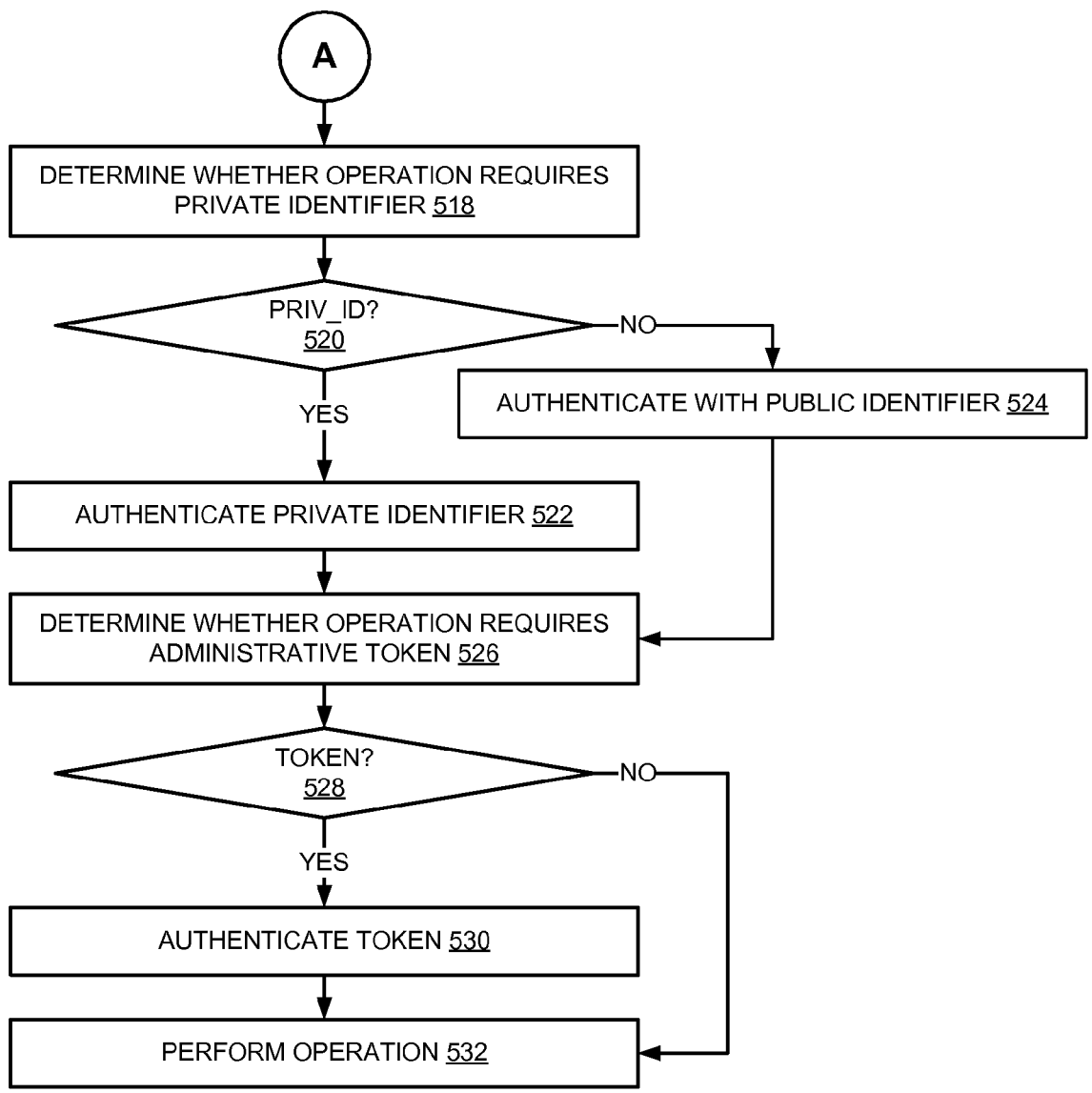

FIGS. 5A-5B represent a flow diagram of an embodiment of a process for a client sharing private data and being able to manage the private data. The method or process may be performed by processing logic that may comprise hardware (e.g., circuitry, programmable logic, microcode, etc.), software (such as instructions run on a processing device), or a combination thereof. In one embodiment, the method is performed by a server (e.g., server 110 of FIG. 1).

A client (e.g., client 122, 124, 126, 220, 320, 410) sends a message to a server (e.g., server 110, 202, 302, 420, 430) and begins to participate in a social network accessible through the server, thus becoming a client of the server with respect to the network, 502. The server generates a private identifier for the client, 504. If the client already has a private identifier that qualifies for the protocol of the network, the server may be able to leverage the existing private identifier rather than needing to generate a new private identifier. The client stores the private identifier locally, 506. It is assumed that the client ensures the security of the private identifier. However, the security risk associated with the client not adequately ensuring the security of the private identifier is principally with the client, and the network and its individual servers may or may not attempt to determine whether the private identifier is secured.

The server receives private data from the client to share on the network, 508. Such data can be considered to be quasi-private, because it is shared. However, the anonymity of the client should be preserved by the manner in which the data is shared on the network. The server generates a public identifier and associates the public identifier with the data, 510. The association of the public identifier provides a mechanism to allow interaction between the client and server with regards to the shared data. The public identifier mechanism is changeable as described herein to provide improved anonymity of the client sharing the data.

The server makes the data available, 512. The server can provide access to elements of the data upon request of other clients 514. The requests may be to see statistics or other compilations of data. A request to access the private data in the form posted to the server by the client requires the use of the public identifier associated with the data. Thus, a client can request to perform an operation (e.g., see FIG. 7) on the data, 516. There may be different levels of authentication required to perform certain operations within the network.

The server determines if the operation requested requires the private identifier, 518. If the private identifier is not required, 520, the server authenticates the client for the operation by use of the public identifier, 524. If the private identifier is required, 520, the server requests the private identifier from the client and authenticates the private identifier, 522. The server may additionally determine whether the requested operation requires an administrative token, 526. If a token is not required, 528, the server enables the client to perform the operation, 532. If a token is required, 528, the server authenticates the token from the client, 530, and then allows the client access to the services for performing the operation, 532.

Figure 6:
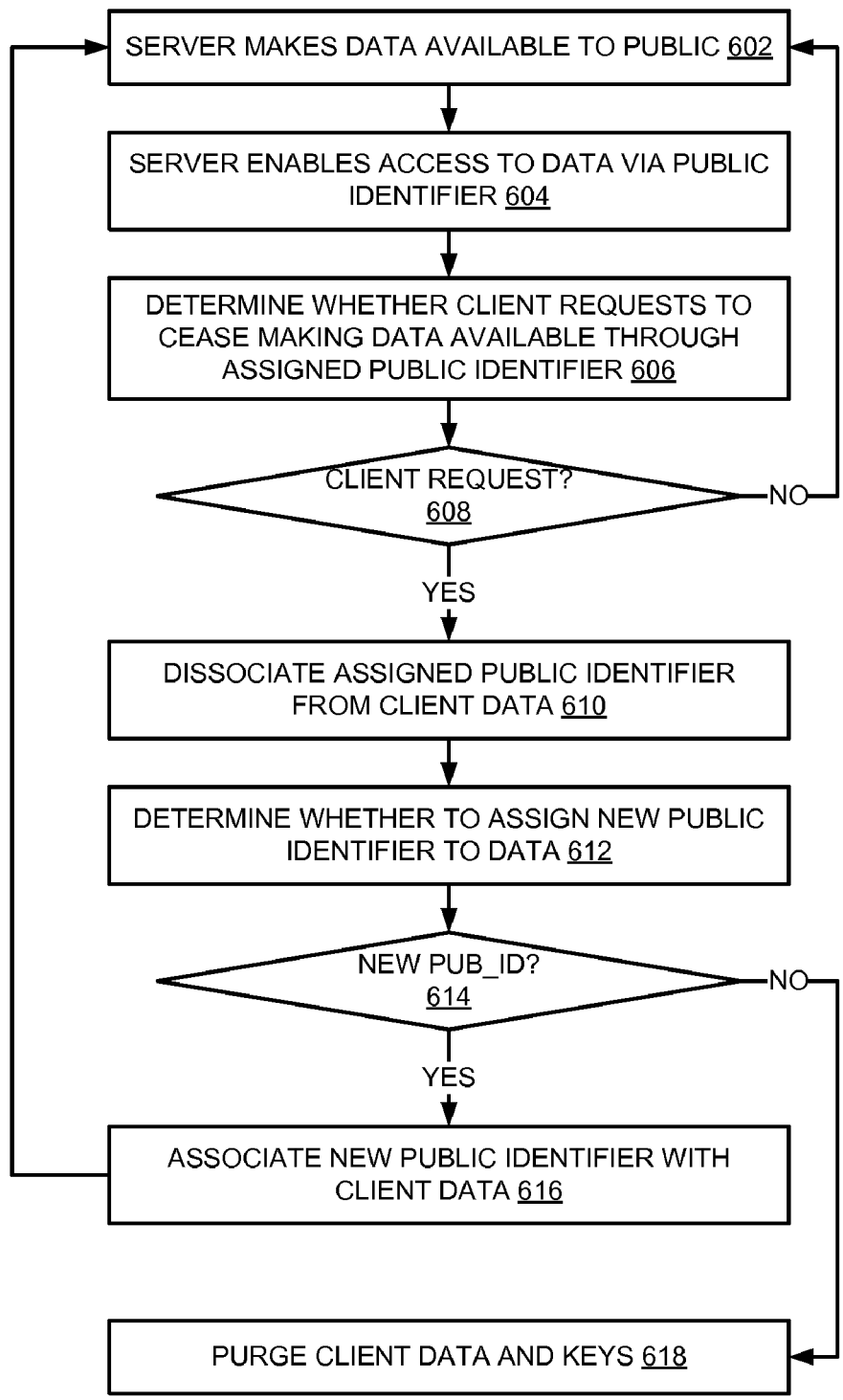
FIG. 6 is a flow diagram of an embodiment of a process for making publicly available data secret.

FIG. 6 is a flow diagram of an embodiment of a process for making publicly available data secret. The method or process may be performed by processing logic that may comprise hardware (e.g., circuitry, programmable logic, microcode, etc.), software (such as instructions run on a processing device), or a combination thereof. In one embodiment, the method is performed by a server (e.g., server 110 of FIG. 1).

A server makes data of a client available to the public, 602. Note that making data available to the public refers here to making the data available in a way that is expected to maintain the anonymity of the client, as discussed herein. The server may make the data available for an unspecified amount of time. The server also allows access to the private data in a non-anonymous way via a public identifier associated with or assigned to the data, 604. The server makes the data available and allows access to the data unless and until the client requests that the server cease making the data available. Thus, the server determines whether communication received from the client is a request to cease making the data available through the assigned identifier, 606.

As long as the client does not request the server to cease making the data available, 608, the server continues to make the data available, 602-608. If the client requests the server to cease making the data available, 608, the server dissociates the assigned public identifier from the client data, 610. Once the public identifier is dissociated from the client data, the data becomes inaccessible via the public identifier. In one embodiment, the server determines whether to assign a new public identifier to the data, 612. Alternatively, the server can automatically assign a new public identifier in response to the request. If a new public identifier is to be assigned to the data, 614, the server associates a new public identifier with the client data, 616, and makes the data available as associated with the new public identifier, 602-608. In one embodiment, the request may be a request to cease making the data available at all. If a new public identifier is not to be associated with the data, 614, the data could be purged from the server, along with any keys associated with the data, 618.

FIG. 7 is a block diagram representing an embodiment of functional operations of an engine to enable a client to manage shared data. As described above, other functions may be supported with particular applications of the teachings herein to different networks. In one embodiment, a network includes access engine 700. Access engine 700 represents one or more functional components of a server that hosts data for the network and controls access to the network. Access engine 700 includes various exemplary functions 710, which each have an associated action 720 and operation requirement 730. Operation 730 describes what requirements are necessary to enable a client to perform the function, which action 720 describes what happens when the function is executed.

"Send" submits data to the server for inclusion in the social network. The send function may be accessible simply by the public identifier (pub_ID). "Update" changes data that has been submitted to the server. "Show" causes the server to provide access to the private data associated with the public identifier. The show function accesses views of the data that are not available generally on the network. "Hide" makes data private again by causing the server to dissociate the public identifier from the submitted data. Access engine 700 may additionally generate a new public identifier in conjunction with the hide function. Similar to the description above with respect to the send function, the update, show, and delete functions are accessible through the use of the public identifier.

"Rate" allows a client of the social network to provide comments or assign ratings or rankings to certain configurations or profiles viewable in the network. The rate function requires not just the public identifier, but a token. The token may be generated by an algorithmic combination of the public and private identifiers. The algorithm may be a hash function, or some other algorithm.

Figure 8:
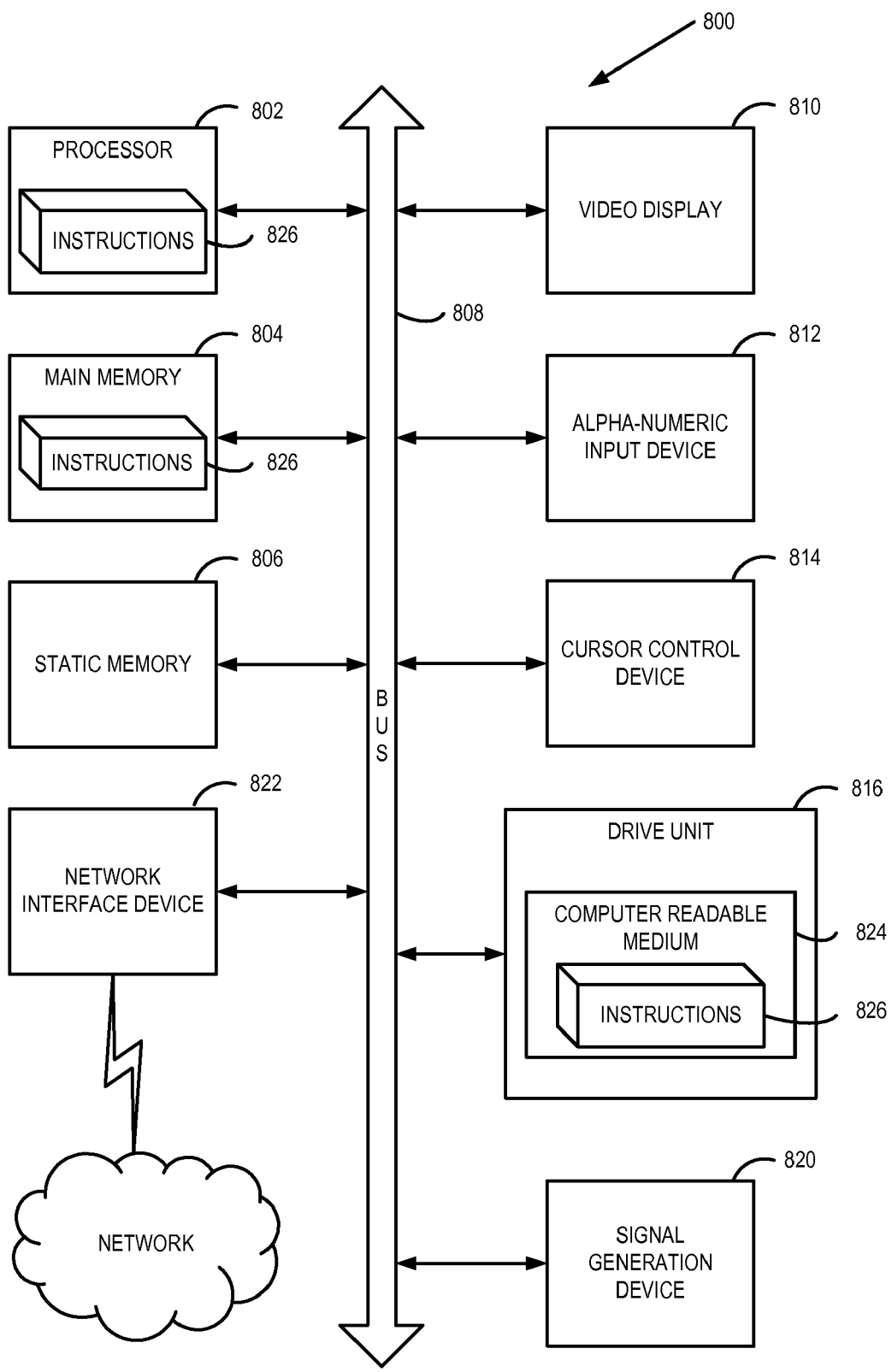
FIG. 8 is a block diagram of a computing device on which embodiments of the invention may be implemented.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 808.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-readable storage medium (or more specifically a computer-readable storage medium) 824 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-readable storage media. The software 822 may further be transmitted or received over a network 820 via the network interface device 808.

While the machine-readable storage medium 824 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method comprising:
   receiving, from an information owner, information to be made available for public access from a server hosting a publicly accessible network location;
   associating, by a processing device, a public identifier with the information at the server, wherein the public identifier does not identify the information owner;
   making the information available from the server to a client that accesses the network location and presents a request for the information associated with the public identifier;
   receiving a request from the information owner to cease making the information available for public access; and
   dissociating the public identifier from the information in response to the request to cease making the information available for public access based on a private identifier associated with the public identifier and a second client.

2. The method of claim 1, wherein receiving the information comprises receiving computer platform profile information that indicates configuration settings of computer hardware, computer software, or both.

3. The method of claim 1, wherein the server hosting the publicly accessible network location comprises the server hosting a social network.

4. The method of claim 1, wherein the public identifier comprises a public universally unique identifier (UUID).

5. The method of claim 1, wherein the information owner is identified by a private UUID that identifies the computing platform of the information owner including hardware and software configuration information.

6. The method of claim 5, wherein the information owner is identified by an additional private UUID that identifies different configuration information for the hardware or software or both of the information owner.

7. The method of claim 5, further comprising:
   receiving the private UUID; and
   permitting the presenter of the private UUID to modify the information associated with the public identifier or request the server to cease making the information available for public access.

8. The method of claim 1, wherein the public identifier is an original public identifier, and further comprising:
   associating a new public identifier with the information in response to dissociating the original public identifier from the information; and
   making the information available from the server to any client that accesses the network location and presents a request for the information associated with the new public identifier.

9. The method of claim 1, further comprising:
   issuing an administrative token to a third client;
   receiving a request from the third client indicating the administrative token and a second public identifier associated with the third client;
   enabling the third client to rate a hardware profile associated with information of an information owner posted on the server.

10. The method of claim 9, wherein issuing the administrative token to the third client comprises:
    receiving from the third client a second private identifier associated with the third client and the second public identifier associated with the third client;
    hashing the second private identifier associated with the third client with the second public identifier associated with the third client to generate the administrative token.

11. The method of claim 10, wherein hashing the second private identifier of the third client with the second public identifier further comprises:
    hashing the second private identifier and the second public identifier together with one or more of an Internet Protocol (IP) address from which the request originated, or a timestamp.

12. A non-transitory machine-readable storage medium having content stored thereon to provide instructions to cause a processing device to perform operations comprising:
    receiving from an information owner information to be made available for public access from a server hosting a publicly accessible network location;

associating, by the processing device, a public identifier with the information at the server, wherein the public identifier does not identify the information owner;

making the information available from the server to a client that accesses the network location and presents a request for the information associated with the public identifier;

receiving a request from the information owner to cease making the information available for public access; and dissociating the public identifier from the information in response to the request to cease making the information available for public access based on a private identifier associated with the public identifier and a second client.

13. The non-transitory machine-readable storage medium of claim 12, wherein the content further provides instructions for identifying the information owner by a private universally unique identifier (UUID) that identifies hardware and software configurations of a computing platform of the information owner, and wherein the public identifier comprises a public universally unique identifier (UUID) linked to the private UUID in a database of the server.

14. The non-transitory machine-readable storage medium of claim 13, wherein the content further provides instructions to identify the information owner by an additional private UUID that identifies different hardware and software configurations of a computing platform of the information owner.

15. The non-transitory machine-readable storage medium of claim 12, wherein the public identifier is an original public identifier, the content to further provide instructions for dissociating the original public identifier from the information in response to a request by the information owner;

associating a new public identifier with the information in response to dissociating the original public identifier from the information; and making the information available from the server to any client that accesses the network location and presents a request for the information associated with the new public identifier.

16. The non-transitory machine-readable storage medium of claim 12, wherein the content further provides instructions for authenticating the public identifier; and permitting the information owner to perform operations in response to authenticating the public identifier, including sending information to be made available from the server, updating information made available from the server, showing information associated with the information owner, and changing the public identifier associated with the information.

17. The non-transitory machine-readable storage medium of claim 12, wherein the content further provides instructions for issuing an administrative token to a third client of the server;

receiving a request from the third client indicating the administrative token and a second public identifier associated with the third client;

enabling the third client to rate a hardware profile associated with information of an information owner posted on the server.

18. The non-transitory machine-readable storage medium of claim 17, wherein the content for issuing the administrative token to the third client further comprises content to provide instructions for receiving from the third client a second private identifier and the second public identifier associated with the third client;

hashing the second private identifier associated with the third client with the second public identifier associated with the third client to generate the administrative token.

19. A server apparatus comprising:

a database storage device to store a private identifier associated with a computing platform configuration of an information owner, a public identifier associated with the information owner, wherein the public identifier does not identify the information owner, and information of the information owner to be made available for public viewing over a social network, where the private identifier and the public identifier are linked in the database, and the public identifier and the information are linked in the database independent of the private identifier;

a processing device communicatively coupled to the database storage device;

an identification generator, executable by the processing device to generate the private and public identifiers for the information owner; and a privacy engine, executable by the processing device to make the information available, receive a request from the information owner to cease making the information available for public access, dissociate the public identifier from the information in response to the request to cease making the information available for public access based on private identifier linked to the public identifier and associated with a client, request the identification generator to generate a new public identifier, and associate the new public identifier with the information and the private identifier.

20. The apparatus of claim 19, wherein the identification generator generates the public identifier and wherein the public identifier is uniquely associated with the private identifier and the server apparatus.

21. The apparatus of claim 19, wherein all clients of the social network have associated public and private identifiers, wherein the privacy engine further restricts access to functions available to the clients of the social network, where access to the functions is controlled by administrative tokens assigned to the clients that are generated by algorithmically combining the private and public identifiers associated with the clients.

* * * * *